April 16, 1968   J. D. MACKENZIE   3,378,362
METHOD FOR MAKING THIN FILM GLASS ELEMENTS
Original Filed Aug. 1, 1961   2 Sheets-Sheet 1

Inventor:
John D. Mackenzie by [signature]
His Attorney.

April 16, 1968  J. D. MACKENZIE  3,378,362
METHOD FOR MAKING THIN FILM GLASS ELEMENTS
Original Filed Aug. 1, 1961  2 Sheets-Sheet 2
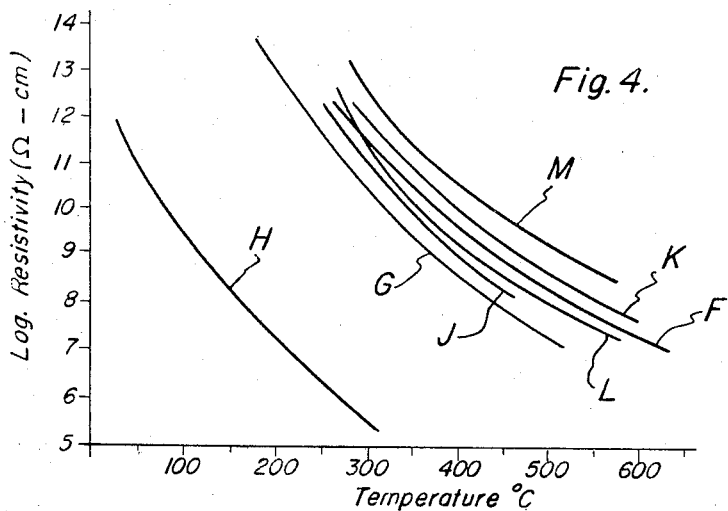
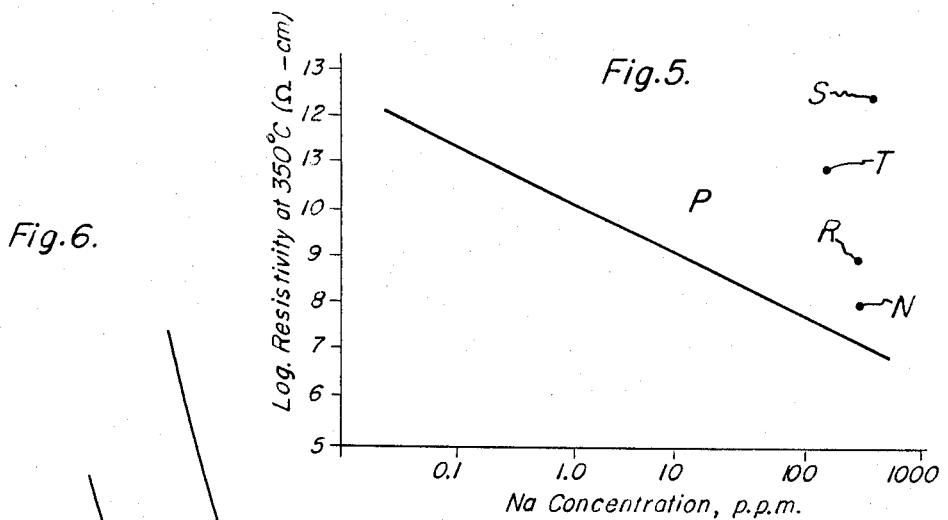
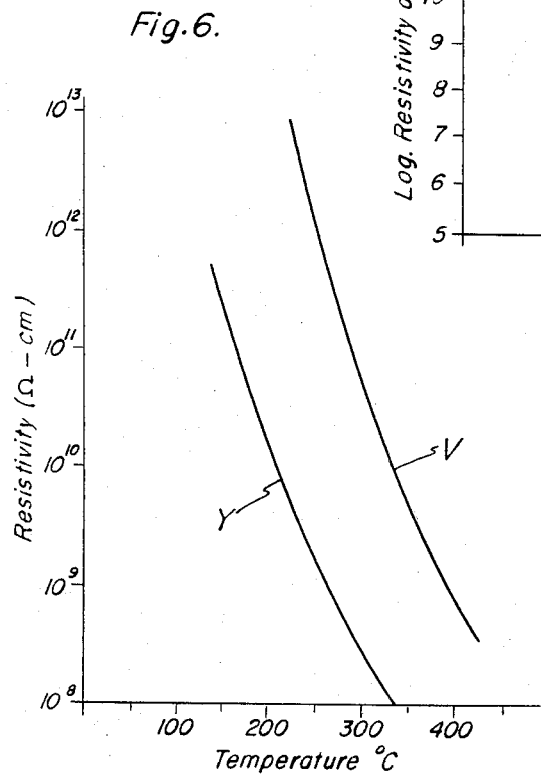
Inventor:
John D. Mackenzie
by
His Attorney.

United States Patent Office 3,378,362
Patented Apr. 16, 1968

3,378,362
METHOD FOR MAKING THIN FILM
GLASS ELEMENTS
John D. Mackenzie, Schenectady, N.Y., assignor to General Electric Company, a corporation of New York
Original applications Aug. 1, 1961, Ser. No. 128,447, and Aug. 23, 1962, Ser. No. 219,045. Divided and this application Jan. 4, 1965, Ser. No. 423,196
4 Claims. (Cl. 65—21)

ABSTRACT OF THE DISCLOSURE

Calcium borate glasses and similar glasses containing from 20 to 40 mole percent of alkaline earth metal oxide and from 60 to 80 mole percent of boron oxide have been found to have high electrical resistivity and to be useful as mica substitutes for electrical applications when formed as sheets of thickness from one-half to 15 mils.

---

The present invention relates generally to the glass-making art and is more particularly concerned with a new method of making articles having high electrical resistance through the use of polycomponent borate, germanate, phosphate and silicate glasses.

This is a division of each of my copending patent applications, Ser. No. 128,447, now abandoned and 219,045, now abandoned filed Aug. 1, 1961, and Aug. 23, 1962, respectively.

It has long been generally recognized that the discovery of a glass having electrical resistance approximating that of mica could have important scientific and commercial consequences. Thus, for lack of such a material, the art has had to compromise between mica, fused silica or quartz and the ordinary silicate or soda-lime glasses for a wide variety of uses and purposes. Accordingly, this has for many years been an active field of research and yet this main objective has heretofore remained unattained.

By virtue of my present invention, which is predicated upon my surprising discoveries subsequently to be described, it is possible to produce borate, germanate, phosphate and silicate glasses which will meet and satisfy requirements which previously compelled the foregoing compromises. In addition, this invention has enabled the development of a new line of products having special utility and advantages over the best prior articles of borate, silicate, phosphate and germanate glasses. It is, for example, possible and feasible through this invention to produce a thin film capacitor of borate, silicate, phosphate or germanate glass having superior electrical characteristics coupled with heat stability and moisture resistance over a wide range of temperature and a prolonged period of time. It is also possible, as a result of this invention, to produce unique semiconducting borate, silicate, phosphate and germanate glasses which are electronically (rather than ionically) conducting and consequently hold important possibilities for use in the production of image orthicon tube targets and other semiconducting elements or devices in which ionic conductivity is most undesirable. Certain semiconducting glasses, based upon the glasses of this invention, are disclosed and claimed in my copending patent application entitled, "Electrically-Conducting Oxide Glasses and Glass Articles," and filed on Aug. 23, 1962, as Ser. No. 219,044, while other semiconducting glasses based upon those of this invention are disclosed and claimed in copending patent application filed on Aug. 1, 1962, as Ser. No. 213,960 in the names of John D. Mackenzie and Stephen P. Mitoff under the title, "Semiconducting Glass." Both said copending applications are assigned to the assignee hereof.

An additional important advantage of these new glasses is their unique workability permitting easy production at relatively low temperatures of bodies or articles of predetermined sizes and shapes. Thus, while fused or vitreous quartz must be worked at temperatures of the order of 2000° C., the present products can readily be worked to form practically and desired shape at temperatures below 1000° C.

One of my discoveries underlying this invention in all its aspects is that boron oxide ($B_2O_3$), silica ($SiO_2$), phosphorous pentoxide ($P_2O_5$), and germanium dioxide ($GeO_2$) can each be compounded with a secondary component in a certain critical manner and processed in a particular way to produce a glass body having properties and characteristics wholly different from borate, silicate, phosphate and germanate glasses heretofore known and markedly superior to those prior art glasses. More specifically, I have found that contrary to expectations, the present glasses will not tarnish in air for relatively long periods of time, which is in sharp contrast to vitreous boron oxide which is soluble in water and in fact is an even better desiccant than anhydrous calcium chloride. Again in contrast to expectations, I have found that the electrical resistivity and the viscosity and the hardness of these new glasses all increase as the content of the secondary component is increased. In addition, I have found that the secondary component must be present in substantial amount, i.e., from 20 to 40 mole percent in the case of borate glass and from 30 to 60 mole percent in the case of silicate, phosphate and germanate glasses, if the new properties and characteristics of these new materials are to be consistently obtained. A further discovery is that the secondary component must be an alkaline earth metal oxide or mixture thereof and I have also found that calcium oxide, barium oxide, and strontium oxide are particularly efficacious. A miscibility discontinuity in the $B_2O_3$-MgO system and in the $B_2O_3$-CaO system and in portions of the other glass systems herein imposes the necessity for a minor quantity of a third component in certain instances if a homogeneous product is to be obtained. Aluminum oxide, potassium oxide or one of the other oxides mentioned just above may be employed for this purpose.

With regard particularly to the novel process of this invention, I have found that the new glass as prepared in accordance with the compositional and process requirements indicated above and subsequently to be described in detail are capable of being blown or drawn out or pressed or otherwise extended to produce membrane-like bodies suitable for use, for example, in thin film capacitors. Because of viscosity characteristics of glasses of this invention over relatively broad temperature ranges, bubbles may be blown in the course of producing thin glass films of the required dimensions for a variety of uses. Sections cut from large bubbles of this glass will normally be of thickness within a fairly broad and readily controlled range related to the bubble size and will be of flatness adequate to a number of different purposes, but in any case may easily be flattened in a warm pressing operation. The homogeneity of these new glasses is readily established in accordance with the present new process and consequently sections cut from large bubbles will consistently be substantially uniform throughout in electrical and physical characteristics.

Briefly described, glass used in accordance with this invention is a polycomponent borate silicate, phosphate or germanate glass having a room-temperature electrical resistivity of at least $10^{18}$ ohm-cm. The silicate and phosphate glasses have resistivity values substantially greater than that of fused silica over the range of temperature from room temperature to more than 500° C. The germanate glasses have resistivity values more than two orders of magnitude higher than $GeO_2$ glass over the range from 200° C. to 450° C. The dielectric constant of this latter glass at room temperature is 16.5 and increases slowly to 17.5 at 320° C., while between room temperature and 300° C. the loss factor, tan δ, is less than $10^{-3}$ for a frequency of 10 kc. These glasses, except the borate glass, all have in common an alkaline earth metal oxide component in an amount between 30 and 60 mole percent of the total glass composition. In the case of the borate glass, the alkaline earth metal oxide component is in amount between 20 and 40 mole percent of the total glass composition.

The method of this invention, generally stated, comprises the steps of mixing together phosphoric acid or finely-divided boric acid, silica or germanium dioxide and an appropriate amount of an alkaline earth metal oxide or its carbonate equivalent, heating the resulting substantially dry and homogeneous mixture and thereby reacting the glass network former with the carbonate or oxide to produce a high resistivity glass, subsequently forming a bubble of said glass and finally shaping a portion of the glass bubble to predetermined form.

Those skilled in the art will gain a further and better understanding of the present invention from the detailed description set forth below taken in conjunction with the drawings accompanying and forming a part of this specification, in which:

FIG. 4 is a chart bearing curves illustrating electrical resistivity data obtained in tests of a variety of glasses and including the present silicate glasses;

FIG. 5 is another chart illustrating resistivity data obtained for several sodium-containing glasses and for fused silica containing various amounts of sodium; and FIG. 6 is still another chart bearing curves comparing the resistivity of fused $GeO_2$ and a barium oxide-germanate glass of this invention over a range of temperatures.

Figure 1:
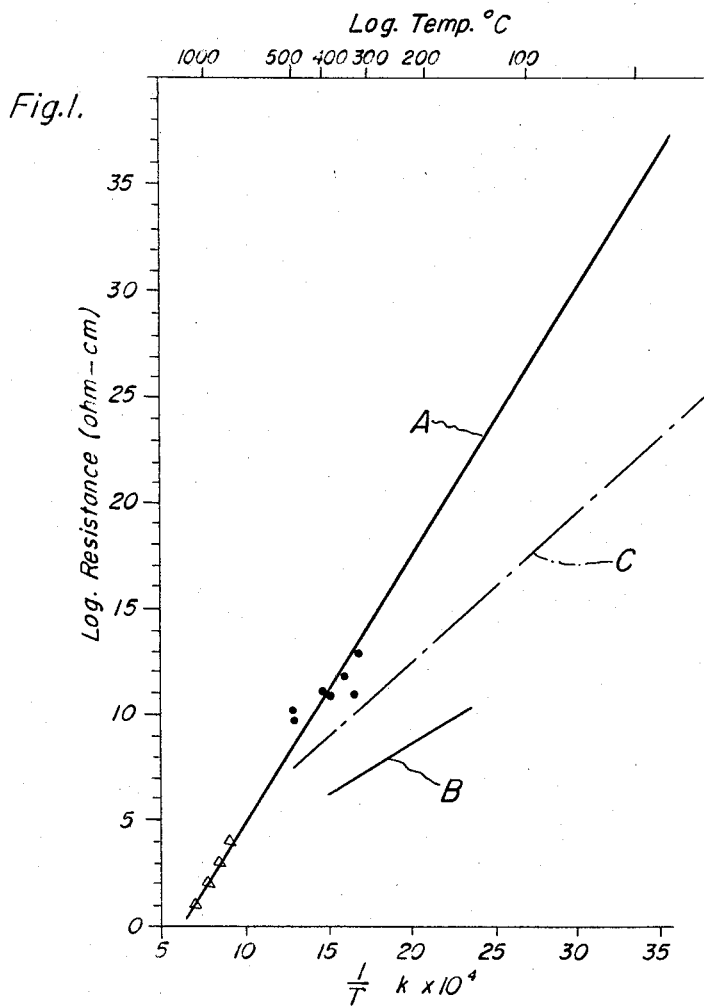
FIG. 1 is a chart bearing curves illustrating electrical resistance data obtained in tests of a variety of glasses and including one of the present borate glasses.

As indicated above, the materials used in accordance with this invention are polycomponent glasses in that they contain at least one component in addition to borate, silicate, phosphate or germanate. Furthermore, the secondary component must be an alkaline earth metal oxide. Also, as indicated above, this secondary constituent must be present in a certain amount and it must serve as a so-called "glass network modifier" as distinguished from a so-called "glass network former." These glasses thus are composed of a network former in the form of borate, silicate, phosphate or germanate and a network modifier which may be calcium oxide, barium oxide, strontium oxide, magnesium oxide or a mixture of two or more of these oxides. Still further, where it is necessary to production of a homogeneous body to overcome the immiscibility of the network modifier in the network former, an additional component such as aluminum oxide or potassium oxide is employed as part of the secondary constituent of the composition. The miscibility-promoting additive may be suitably employed in an amount ranging from about one mole percent to five mole percent of the ultimate glass composition and it may be incorporated in the raw mixture of oxides preparatory to the heating step. Alternatively, it may be added when the basic components of the glass are in the liquid state.

The amount or proportion of the secondary constituent of these glass compositions is highly critical to the consistent production through this invention of the desired glass products. If the secondary constituent content of the entire composition is less than 30 mole percent (20 mole percent in the case of borate glass), one or another or all of the special desirable properties of these glasses will be significantly impaired or even destroyed. On the other hand, if the secondary constituent aggregates more than 60 mole percent (40 mole percent in the case of borate glass) of the ultimate network former-network modifier composition, one or more of these same properties will be again adversely affected to an important extent. It will be understood, however, that other materials may be added to the basic glass consisting of the network former and network modifier components to obtain special effects or results. These additives, however, do not constitute the basis upon which the critical 30–60 mole percent range (or 20 to 40 mole percent range as the case may be) of the secondary constituent is calculated. Further, the use of such additives and the amounts employed will depend upon the specific properties desired in a given case and the effects which relatively large amounts of optional additives have upon the desired physical and electrical properties of the glass.

Bodies of these new glasses of various dimensions and shapes may be produced for a variety of uses. I have, for example, produced membrane-like glass bodies suitable for use as thin film electrical capacitors and I have also succeeded in producing glass plates, sheets, and strips of thickness approaching one-half inch. The thickness limitation at the upper end of the range is set by practical considerations while that at the lower end of the range is fixed by the use to be made of such materials. Because of the close similarity between these new glasses and micas in respect to their dielectrical strengths, I have produced sheets of these glasses ranging in thickness from one-half mil to 15 mils to test their suitability as a mica-substitute for a variety of electrical applications. On the basis of these tests, I have been able to establish that over the full thickness range of micas in general use, these new glasses can perform the same functions and produce the same results as micas. However, because of the ease of production of homogeneous bodies of uniform predetermined thickness and any desired size and the ability to control the dielectric strengths and other important properties of these new glasses, they may be preferred to micas for many commercial uses. The following illustrative, but not limiting, examples of the practice of this invention method in the preparation of my new glasses are offered in the interest of further apprising those skilled in the art as to representative details and specific data.

EXAMPLE I

Finely-divided boric acid of reagent grade is mixed together with 20 mole percent of barium carbonate and the resulting substantially dry and homogeneous mixture is then heated in an open platinum vessel. The temperature of the mixture is thereby rapidly raised to 1250° C. and maintained at that level until a reaction resulting in the formation of $BaO \cdot 4B_2O_3$ is complete. The resulting glass is blown to produce a generally ellipsoidal bubble having a major diameter approximating six inches. This bubble is cooled without cracking and portions of it may be selected for test or use.

EXAMPLE II

In another similar operation, calcium borate glass was prepared by fusing a mixture of Baker reagent grade CaO and Pacific Coast Borax pure $B_2O_3$ in an open platinum crucible at 1250° C. The ratio of ingredients was established at 33.3 mole percent of CaO so that theoretically the product was exactly $CaO \cdot 2B_2O_3$. Chemical analysis of the product, however, showed that the CaO content was 33.9 mole percent.

The resulting glass product was subjected to viscosity and electrical conductivity measurements made in a counterbalanced apparatus of special design as described in an article beginning at page 297 of volume 27 of Review of Scientific Instruments. The solidified glass was then annealed in dry $N_2$ and cut into thin slices of about 1 mm. thickness and roughly polished for subsequent measurements. A thin layer of platinum (about 2 microns) was sputtered onto the surfaces of samples for electrical measurements. Hardness measurements at room temperature were made with a Kentron Microhardness Tester. For solubility measurements, small pieces weighing approximately 0.5 gram were immersed in water at 30° C. and 100° C. with occasional stirring and their weight losses were recorded.

Microscopic and X-ray examination were carried out on both the annealed glass and on samples which had been repeatedly heated up to 500° C. during electrical measurements. No crystalline phases were found either on the surface or in the interior of the samples.

The electrical resistivity data obtained for both the molten and the solidified glass are shown in FIG. 1. The former results were obtained from A.C. and the latter from D.C. measurements. Published data for fused silica and a Pyrex-type glass are included for comparison. It is remarkable that a simple glass containing more than 30 mole percent metal oxide should have such high resistivity. At temperatures below 500° C., the specific resistance of the present glass proved to be greater than that of vitreous silica. On account of the difficulties involved when the resistivity is in excess of $10^{13}$ ohm-cm., no measurements were made at temperatures below 300° C. Extrapolation to room temperature indicate (FIG. 1) that the resistivity can be higher than $10^{35}$ ohm-cm. which may be contrasted with the corresponding value of about $10^{35}$ ohm-cm. for vitreous silica. However, even if a different conduction process involving a much lower activation energy, say of 10 kcal/mole, should predominate at the lower temperatures, then the specific resistance at room temperature is still at least $10^{18}$ ohm-cm. At 500° C., the specific resistance is in the same order of magnitude as that of forsterite, and there is no prior known glass having such low conductivity at this temperature.

The resistivity values at various temperatures are plotted on FIG. 1 as triangles (representing melt A.C. data) and dots (representing solid glass D.C. data) fixing the location and slope of curve A. For comparison, published data for a typical Pyrex-type glass and for fused silica are represented on this same chart by curves B and C, respectively.

Figure 2:
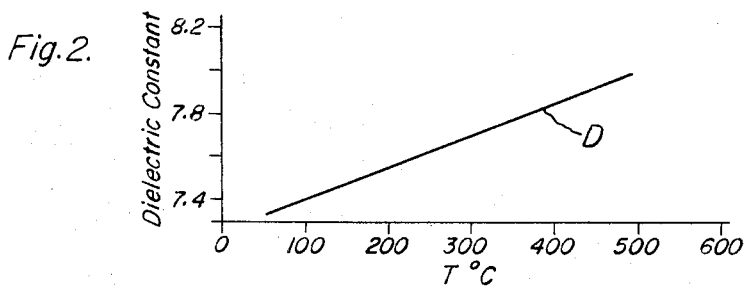
FIG. 2 is another chart bearing curves illustrating in the FIG. 1 glass the relation between dielectric constant and temperature.
Figure 3:
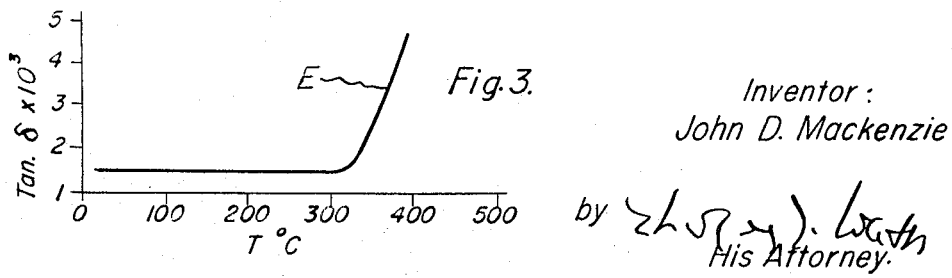
FIG. 3 is another chart bearing curves illustrating variation in power factor tangent δ of the glass sample of FIG. 2 over a relatively broad temperature range.

The dielectric constant and tangent δ values for two specimens from room temperature to 500° C. are represented by curves D and E in FIGS. 2 and 3, respectively.

At room temperature, the Vickers hardness number of the present glass was 565 kg./mm.². The value for pure $B_2O_3$ is only about 120. Typical values for fused silica and soda lime glass are 600 and 300, respectively, for these new glasses and silicate glasses. At 30° C., the weight losses of the present glass, after five hours immersion in water with stirring, was only 0.4 percent.

From both direct observations and the extrapolation of the high-temperature viscosity results, the approximate annealing temperature is 650° C.

The dielectric strength of this glass was measured as follows:

(1) A.C.—3400 volts per mil on ½ mil thick sample
(2) D.C.—2500 to 2800 volts per mil on 15 mil thick samples
(3) 1000 to 1500 volts per mil on 1 mil thick coatings on steel

EXAMPLE III

In still another similar operation, a strontium oxide glass was prepared by fusing a mixture of Baker reagent grade SrO and Pacific Coast Borax pure $B_2O_3$ in a platinum crucible at 1250° C. The amounts of these reagents employed were such as to produce glass of about 30 mole percent SrO. Tests carried out on the solified glass product following annealing in dry $N_2$ and cutting into thin slices of about 30-mil thickness and roughly polished produced results closely approximating those obtained in the tests of the Example II glass product. Accordingly, this material is likewise suitable for the same uses and purposes that might be made of the Example II calcium borate glass.

EXAMPLE IV

A magnesium borate glass having similar properties to the glasses of Examples I through III was produced by mixing together Baker reagent grade MgO and $Al_2O_3$ with Pacific Coast Borax pure $B_2O_3$ and then fusing the mixture in an open platinum crucible at 1250° C., as described above. The $Al_2O_3$ in amount of five mole percent eliminated the miscibility discontinuity in the $MgO \cdot B_2O_3$ system and did not have any detrimental effect upon the physical characteristics, including the electrical properties of this new glass.

EXAMPLE V

A complex glass of this invention containing appreciable amounts of calcium, strontium and barium was produced by mixing together Baker reagent grade CaO, SrO and BaO with Pacific Coast Borax pure $B_2O_3$ and fusing this mixture in an open platinum crucible at 1250° C. until the reaction resulting was complete. Tests carried out on samples of this glass product as described in Example II established that this product could advantageously be put to the same uses as the calcium borate glass of Example II. Chemical analysis of this glass revealed that it has the following composition:

| | Mole percent |
|---|---|
| CaO | 11 |
| SrO | 10 |
| BaO | 11 |
| $B_2O_3$ | 68 |

Additional data gathered in testing glasses of this invention are set forth in the following table:

TABLE A

| Glass | T.° C. | Specific Resistance, ohm-cm. |
|---|---|---|
| (33%) $SrO.2B_2O_3$ | 450 | $10^{11}$ |
| | 530 | $10^{10}$ |
| (33%) $BaO.2B_2O_3$ | 500 | $10^{9}$ |
| | 350 | $10^{12}$ |
| (33%) $MgO.2B_2O_3$ (plus five mole per-$K_2O$) | 490 | $10^{10}$ |
| | 425 | $10^{11}$ |
| | 375 | $10^{12}$ |

As generally indicated above, these new glass products may contain substances in addition to the glass network former (i.e. $B_2O_3$) and the glass network modifier. Thus in the case of magnesium borate it is essential that an amount of a miscibility promoting agent be present. This is the case also for certain calcium borate glasses of this invention, specifically those containing less than 27 mole percent of CaO. In any event, however, from one mole percent to five mole percent of this agent is sufficient for this purpose and the use of a substantially large amount can impair the desired properties of these new products. The use of this agent is necessary when the amount of the glass network modifier is less than the amounts stated below:

| | Mole percent |
|---|---|
| Magnesium oxide | 47 |
| Calcium oxide | 27 |
| Strontium oxide | 21 |

Other substances such as silica may also be present in readily detectable amounts in these glasses without impairing their properties materially. Preferably, however, the amount of silica and other such "inert" impurities will not exceed five mole percent of the glass composition. Further, those skilled in the art will understand that the glasses of this invention are not in any sense borosilicate glasses and are not similar to those glasses either in composition or in properties, the silica content of the present products making no contribution whatever to their unique and valuable characteristics.

EXAMPLE VI

Reagent grade calcium carbonate and powdered quartz are mixed together in proportions corresponding to 40 mole percent of calcium oxide and 60 mole percent of silica, and then heated in air in a platinum crucible. Heating continued for one hour with the temperature being maintained at 1600° C. and the mixture therefore in a molten state. The resulting glass has a resistivity of $10^{20}$ ohm-cm. at room temperature and resistivity over several hundred degrees centigrade as indicated by curve F of FIG. 4. By way of comparison, curve G of FIG. 4 represents the resistivity characteristics of fused silica containing less than one-twentieth as much sodium, while curve H depicts the characteristics of a soda-lime silicate glass containing 17 weight percent $Na_2O$.

EXAMPLE VII

In a repetition of the Example VI experiment, a mixture of equal parts of CaO and $SiO_2$ was prepared and the resistivity of this glass over the same broad temperature range was determined and plotted as curve J of FIG. 4.

EXAMPLE VIII

Curve K of FIG. 4 represents the resistivity of still another glass prepared, in general, according to the procedure set forth in Example VI. In this case, however, barium carbonate and silicic acid (both of reagent grade) were used in proportions leading to the formation of a 30 mole percent BaO-70 mole percent $SiO_2$ glass on heating in air for 1450° C. for one hour. This glass contained approximately 10 times more sodium than did the fused silica of curve G.

EXAMPLE IX

Melting a mixture of 48 mole percent MgO and 52 mole percent $SiO_2$ (both reagent grade) at 1600° C. and holding at that temperature for an hour in an air atmosphere, as described in Example VI, lead to the formation of a glass, the resistivity characteristics of which are illustrated by curve L of FIG. 6. The sodium content of this glass was likewise 10 times greater than that of the curve G material.

EXAMPLE X

Using reagent grade $MgCO_3$, $CaCO_3$ and $SiO_2$ (as silica sand), another of these new glasses was produced having the resistivity-temperature properties depicted by curve M of FIG. 4. This glass was composed of 50 mole percent $SiO_2$ and 25 mole percent of each CaO and MgO and had a sodium content amounting to about 10 times that of the curve G fused silica.

EXAMPLE XI

A mixture of calcium carbonate and phosphoric acid was melted in air in an open platinum crucible and maintained at 1450° C. for one hour. With the resulting mass in the molten state, a stream of dry nitrogen (dew point −40° C.) was bubbled through it for 30 minutes to drive off the last traces of moisture and then melt was cast. Analysis of the resulting glass established its composition as 33 mole percent CaO and 67 mole percent $P_2O_5$ with about 500 parts per million of sodium. The resistivity of this glass at 350° C. is indicated at N on the chart of FIG. 5 where the log of resistivity at 350° C. is plotted against sodium concentration in p.p.m. for fused silica (curve P) and for the glass of Example XII (point R) and the glass of Example II (point S), and a calcium silicate glass of this invention having the composition $CaO \cdot 1.5SiO_2$ (point T).

EXAMPLE XII

This glass, as indicated in Example XI, is similar to the glass of Example XI and was prepared in the same manner, its different electrical resistivity being attributable to its different composition. Actually, this glass is composed of equal parts of glass network former and glass network modifier, viz. 50 mole percent $P_2O_5$ and 50 mole percent CaO and about 500 p.p.m. of sodium ion. Also, as in the case of Example XI, the extrapolated electrical resistivity of this glass at room temperature is greater than $10^{18}$ ohm-cm.

EXAMPLE XIII

A germanate glass was made according to the foregoing procedure by mixing barium carbonate and germanium dioxide powders and melting the resulting mixture in a platinum crucible in air and maintaining its temperature at 1300° C. for one hour and then casting and cooling the mass. This glass had a composition approximating 39 mole percent BaO and 61 mole percent $GeO_2$ and an electrical resistivity characteristic illustrated by curve V of FIG. 3. Curve Y represents the electrical resistivity of $GeO_2$ (fused) over the same temperature range and it is seen that while the impurity levels of these two materials are the same (reagent grade $GeO_2$ and barium carbonate being used throughout), the resistivity of the new glass is more than two orders of magnitude greater than that of the $GeO_2$ over the range from 200° C. to 450° C. and the extrapolated resistivity of the glass at room temperature is greater than $10^{20}$ ohm-cm. The dielectric constant of this glass at room temperature is 16.5 and increases slowly to 17.5 at 320° C., while the loss factor, $\tan \delta$, is less than $10^{-3}$ for a frequency of 10 kc.

As generally indicated above, these glass products may contain substances in addition to the glass network former and the glass network modifier. Thus, in the case of magnesium borates, magnesium silicates, magnesium phosphates and magnesium germanates, it is essential that an amount of a miscibility promoting agent be present. This is the case also for certain of the present calcium silicate, phosphate and germanate glasses, specifically those containing less than 27 mole percent of CaO. In any event, however, from one mole percent to five mole percent of this agent is sufficient for this purpose and the use of a substantially larger amount can impair the desired properties of these new products. The use of this agent is necessary when silicate, phosphate or germanate glass is involved and the amount of the glass network modifier is less than the amounts stated below:

| | Mole percent |
|---|---|
| Magnesium oxide | 41 |
| Calcium oxide | 27 |
| Strontium oxide | 21 |

Other substances such as $Al_2O_3$ may also be present in readily detectable amounts in these glasses without impairing their properties materially. Preferably, however, the amount of "inert" impurities will not exceed five mole percent of the glass composition.

These present glasses, as the data represented by the accompanying charts illustrate, have in common the important property of alkali metal ion immobility. The strong tendency for these ions to move in response to the application of an electrical potential is offset by the alkaline earth ions of these glasses and since the alkaline earth ions themselves do not move under such condition, these glasses have high resistivity values, there being no effective current-conducting means within the glass bodies or masses.

It will be understood that throughout this specification and in the appended claims, whatever amounts, proportions, ratios or percentages are stated, reference is made to the weight basis rather than to the volume basis, and mole percent is employed for convenience to express weight relationships of reagents and constituents.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the specifically described embodiments of the invention may be made without departing from the scope of the invention as set forth in what is claimed.

What I claim as new and desire to secure by Letters Patent of the United States is:

1. The method of making a substantially water-insoluble membrane-like borate glass body suitable for use as a capacitor element and comprising boron oxide and calcium oxide which comprises the steps of mixing together finely-divided boric acid and calcium carbonate in the approximate proportions of 60 to 80 mole percent and 20 to 40 mole percent, respectively, heating the resulting substantially dry and homogeneous mixture and thereby reacting the boric acid with the calcium carbonate to produce calcium borate glass, subsequently forming a bubble of said glass, and shaping a portion of the glass bubble to predetermined form for use as a thin film capacitor.

2. The method of making a substantially water-insoluble borate glass body having a room temperature electrical resistivity of at least $10^{18}$ ohm-cm. and comprising a major proportion of boron oxide and from 20 to 40 mole percent of an alkaline earth metal oxide which comprises the steps of heating and reacting alkaline earth metal oxide and boron oxide to produce a borate glass, and forming a body of said borate glass of thickness within the range of thickness of walls of bubbles, approximately one-half mil to 15 mils, of the said glass for use in electrical apparatus.

3. The method of making a substantially water-insoluble membrane-like borate glass body suitable as a substitute for mica bodies in electrical applications and comprising a major proportion of boron oxide and from 20 to 40 mole percent of an alkaline earth metal oxide which comprises the steps of heating an alkaline earth metal oxide and boron oxide together and thereby causing a reaction between the said oxides resulting in the formation of a borate glass, and forming a sheet of said glass of thickness within the range of one-half mil to 15 mils for use in electrical apparatus.

4. The method of making a thin film capacitor element having superior electrical characteristics coupled with heat stability and moisture resistance over a wide range of temperature and a prolonged period of time which comprises the steps of heating together and reacting an alkaline earth metal oxide and a source of boron oxide selected from the group consisting of boric acid and borax and thereby forming a borate glass having room temperature electrical resistivity of at least $10^{18}$ ohm-cm. and room temperature hardness greater than 500 kg./cm.$^2$ and a softening temperature higher than 500° C., and forming a thin film of the said glass in predetermined bubble form for use as a capacitor element and cooling and solidifying the resulting glass thin film element.

References Cited

UNITED STATES PATENTS

| | | | |
|---|---|---|---|
| 3,320,043 | 5/1967 | Mackenzie | 65—87 XR |
| 3,061,752 | 10/1962 | Banks. | |
| 3,252,812 | 5/1966 | Dufaure | 106—54 X |
| 2,077,481 | 4/1937 | Huppert et al. | |
| 2,678,281 | 5/1954 | Geffeken et al. | |
| 2,701,848 | 2/1955 | Miles. | |
| 2,899,584 | 8/1959 | Verwey. | |
| 2,939,797 | 6/1960 | Rindone. | |
| 3,005,721 | 10/1961 | Cerulli. | |
| 3,022,179 | 2/1962 | Morrissey. | |
| 3,081,179 | 3/1963 | Charvat et al. | |
| 3,093,598 | 6/1963 | McMillan. | |

OTHER REFERENCES

Levin et al.: Phase Diagrams For Ceramists, Am. Ceram. Soc. (1956), pp. 41, 48, 66, 115–118, 199.

Am. Ceramic Soc. Journal, vol. 35, No. 4, April 1952, pp. 99–102.

DONALL H. SYLVESTER, *Primary Examiner.*

FRANK W. MIGA, *Examiner.*